United States Patent
Kojo (10) Patent No.: US 11,928,619 B2
(45) Date of Patent: Mar. 12, 2024

(54) VEHICLE DISPATCH SERVICE BOARDING LOCATION DETERMINATION METHOD, AND VEHICLE DISPATCH SERVICE BOARDING LOCATION DETERMINATION DEVICE

(71) Applicants: Nissan Motor Co., Ltd., Yokohama (JP); Renault S.A.S., Boulogne-Billancourt (FR)

(72) Inventor: Naoki Kojo, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 17/436,107

(22) PCT Filed: Apr. 3, 2019

(86) PCT No.: PCT/IB2019/000413
§ 371 (c)(1),
(2) Date: Sep. 3, 2021

(87) PCT Pub. No.: WO2020/201802
PCT Pub. Date: Oct. 8, 2020

(65) Prior Publication Data
US 2022/0164737 A1 May 26, 2022

(51) Int. Cl.
*G06Q 30/0203* (2023.01)
*G01C 21/34* (2006.01)
(Continued)

(52) U.S. Cl.
CPC ....... *G06Q 10/06311* (2013.01); *G08G 1/202* (2013.01); *G01C 21/3438* (2013.01)

(58) Field of Classification Search
CPC ... G06Q 10/06311; G06Q 50/30; G08G 1/202
(Continued)

(56) References Cited

U.S. PATENT DOCUMENTS 10,671,862 B2 * 6/2020 Rochan Meganathan ................... G06V 20/58
11,250,708 B2 * 2/2022 Shimizu ................. G08G 1/202
(Continued)

FOREIGN PATENT DOCUMENTS

| CN | 107063286 A | 8/2017 |
| CN | 107248273 A | 10/2017 |

(Continued)

OTHER PUBLICATIONS

A. Rae and O. Basir, "Reducing multipath effects in vehicle localization by fusing GPS with machine vision," 2009 12th International Conference on Information Fusion, 2009, pp. 2099-2106. (Year: 2009).*

(Continued)

*Primary Examiner* — Patricia H Munson
*Assistant Examiner* — Thea Labogin
(74) *Attorney, Agent, or Firm* — Global IP Counselors, LLP (57) ABSTRACT

A vehicle dispatch service boarding location determination method uses a vehicle dispatch information data server and a terminal to determine a boarding location for a dispatched vehicle based on a vehicle dispatch request from the terminal. When there is a vehicle dispatch request, position information of a vehicle dispatch request point is acquired. Boarding location candidates present in a periphery of the vehicle dispatch request point are calculated based on the position information point and map information. A boarding location recognition difficulty, which is a difficulty for the user in recognizing the boarding location candidate as a boarding location, is calculated for each of the boarding location candidates. A boarding location candidate for which the boarding location recognition difficulty is low among the boarding location candidates is determined as the boarding (Continued)

location where the user will be picked up by the dispatched vehicle.

12 Claims, 4 Drawing Sheets

(51) Int. Cl.
*G06Q 10/0631* (2023.01)
*G08G 1/00* (2006.01)
*G10L 15/02* (2006.01)
*G10L 15/22* (2006.01)
*G10L 15/30* (2013.01)
*G10L 25/51* (2013.01)

(58) Field of Classification Search
USPC .......................................... 705/7.13
See application file for complete search history.

(56) References Cited

U.S. PATENT DOCUMENTS

| | | | |
|---|---|---|---|
| 2016/0370194 A1* | 12/2016 | Colijn | .................... G01C 21/34 |
| 2018/0342035 A1 | 11/2018 | Sweeney et al. | |
| 2019/0012613 A1 | 1/2019 | Ikeda et al. | |
| 2019/0017839 A1* | 1/2019 | Eyler | .................... G02B 27/01 |
| 2019/0064814 A1* | 2/2019 | Pandit | .................... G08G 1/202 |
| 2019/0086222 A1 | 3/2019 | Arakawa | |

FOREIGN PATENT DOCUMENTS

| | | | |
|---|---|---|---|
| CN | 107403560 | A | 11/2017 |
| CN | 109115237 | A | 1/2019 |
| CN | 109558957 | A | 4/2019 |
| JP | 2000-35341 | A | 2/2000 |
| JP | 4486650 | B2 | 6/2010 |
| JP | 4578553 | B2 | 11/2010 |
| JP | 2015-204005 | A | 11/2015 |
| JP | 6415672 | B1 | 10/2018 |
| JP | 2019-16290 | A | 1/2019 |
| KR | 10-1917316 | B1 | 11/2018 |
| WO | 2006/077638 | | 7/2006 |
| WO | 2008/041283 | A1 | 4/2008 |
| WO | WO-2018209151 | A1 * | 11/2018 ......... G01C 21/3423 |

OTHER PUBLICATIONS

I. -S. Weon, S. -G. Lee and J. -K. Ryu, "Object Recognition Based Interpolation With 3D LIDAR and Vision for Autonomous Driving of an Intelligent Vehicle," in IEEE Access, vol. 8, pp. 65599-65608, 2020, doi: 10.1109/ACCESS.2020.2982681. (Year: 2020).*

Smartphone-Based Real Time Vehicle Tracking in Indoor Parking Structures Ruipeng Gao; Mingmin Zhao; Tao Ye; Fan Ye; Yizhou Wang;Guojie Luo IEEE Transactions on Mobile Computing Year: 2017 | vol. 16, Issue: 7 | Journal Article | Publisher: IEEE (Year: 2017).*

Jagadeesh, G.R., Srikanthan, T., & Zhang, X.D. (2004). A Map Matching Method for GPS Based Real-Time Vehicle Location. Journal of Navigation, 57(3), 429-440. (Year: 2004).*

* cited by examiner

FIG. 5

VEHICLE DISPATCH SERVICE BOARDING LOCATION DETERMINATION METHOD, AND VEHICLE DISPATCH SERVICE BOARDING LOCATION DETERMINATION DEVICE

This application is a U.S. national stage application of International Application No. PCT/IB2019/000413, filed on Apr. 3, 2019.

BACKGROUND

Technical Field

The present disclosure relates to a vehicle dispatch service boarding location determination method and a vehicle dispatch service boarding location determination device with which a vehicle is dispatched according to a dispatch request from a user.

Background Information

In the prior art, one or more recommended pick-up/drop-off points are presented to a user from predetermined possible pick-up/drop-off points based on a difficulty of access from a point where the user makes a vehicle dispatch request. Vehicle dispatch service boarding location determination systems that dispatch vehicles to pick-up/drop-off points selected by users are known (refer, e.g., to U.S. Patent Application Publication No. 2016/0370194—Patent Document 1).

SUMMARY

In the system disclosed in Patent Document 1, a recommended pick-up/drop-off spot is selected using a difficulty of access for a user and a difficulty of access for an autonomously driven vehicle. However, in the case of a station-free vehicle dispatch service that allows passengers to be picked up and dropped off anywhere, there has been a problem in that the user cannot appropriately recognize the boarding location because there is no physical landmark at the boarding location.

The present disclosure was contrived in view of the problem described above, it being an object of the present disclosure to determine an appropriate boarding location from among boarding location candidates so that a user can correctly arrive at the boarding location when there is a vehicle dispatch request from the user.

To achieve the object described above, the present disclosure is a vehicle dispatch service boarding location determination method that uses a vehicle dispatch information data server to determine a boarding location where for a dispatched vehicle based on a vehicle dispatch request from the terminal, wherein the following procedure is followed. When the vehicle dispatch request is acquired, position information of a point where the vehicle dispatch was requested is acquired. Boarding location candidates present in a periphery of the position information are extracted based on the position information and map information. Information on peripheral targets present in peripheries of the boarding location candidates is extracted based on a map database in which visible targets are registered as points on a map. Boarding location recognition difficulties, which are indexes expressing the ease of recognizing the boarding location candidates as the boarding location, are calculated based on positional relationships between the boarding location candidates and the peripheral targets. Of the boarding location candidates, a boarding location candidate for which the boarding location recognition difficulty is low is determined as the boarding location.

Therefore, when there is a vehicle dispatch request from a user, an appropriate boarding location can be determined from among boarding location candidates so that the user can correctly arrive at the boarding location.

BRIEF DESCRIPTION OF THE DRAWINGS

Referring now to the attached drawings which form a part of this original disclosure.

DETAILED DESCRIPTION OF EMBODIMENTS

An embodiment of a vehicle dispatch service boarding location determination method and a vehicle dispatch service boarding location determination system according to the present disclosure is described below based on the first embodiment shown in the drawings.

First Embodiment

The vehicle dispatch service boarding location determination method and the vehicle dispatch service boarding location determination system of a first embodiment are applied to an on-demand vehicle dispatch service network, which dispatches a vehicle in accordance with a vehicle dispatch request from a user. A description of a configuration of the first embodiment is divided below into sections "Overall system configuration" and "Detailed configurations of vehicle dispatch information data server/in-vehicle onboard unit/mobile terminal."

<Overall System Configuration>

Figure 1:
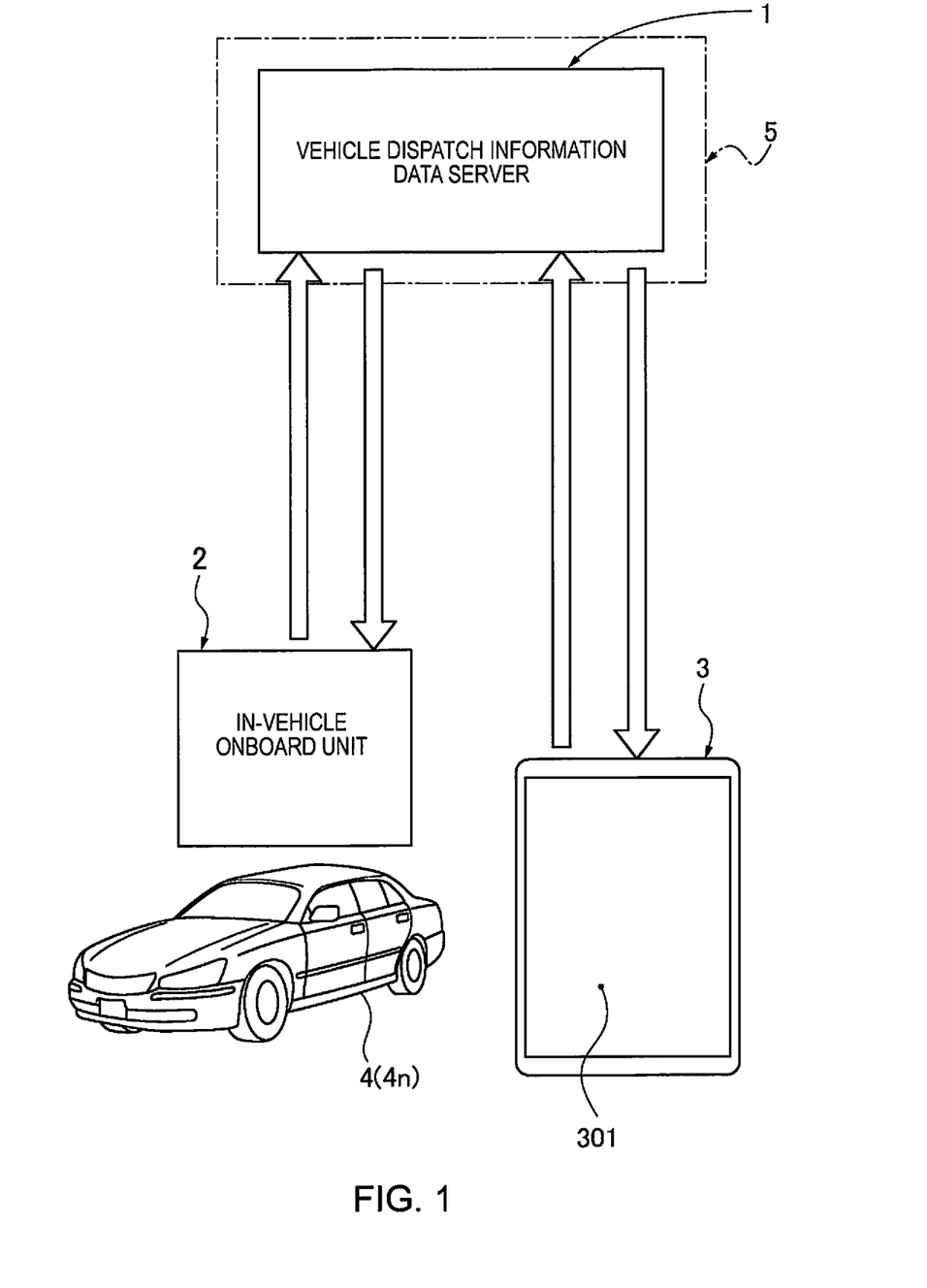
FIG. 1 is a network configuration diagram of an overall configuration of a vehicle dispatch service network to which a vehicle dispatch service boarding location determination method and a vehicle dispatch service boarding location determination system of a first embodiment have been applied.

FIG. 1 shows an overall configuration of a vehicle dispatch service network to which a vehicle dispatch service boarding location determination method and a vehicle dispatch service boarding location determination system of the first embodiment have been applied. An overall system configuration of a vehicle dispatch service network is described below based on FIG. 1.

The vehicle dispatch service network is provided with a vehicle dispatch information data server 1, an in-vehicle onboard unit 2 (in-vehicle terminal), and a mobile terminal 3 (user terminal), as shown in FIG. 1. These information devices exchange information by sending and receiving signals via wireless communication. The term "vehicle dispatch service" in this embodiment refers to a service that handles a vehicle belonging to, for example, a taxi service, a rent-a-car service, a ride-share service, etc., as a dispatched vehicle 4, and dispatches the vehicle in accordance with a vehicle dispatch request from a user.

The vehicle dispatch information data server 1 is configured from one or more computers as is generally known, and is a program service that performs various processes upon receiving signal inputs from an external source. The data server 1 is installed in, for example, a vehicle dispatch service management center 5. The vehicle dispatch information data server 1 of the first embodiment is described as a server that has both a vehicle management function for a plurality of dispatched vehicles 4*n* and a user management function for managing numerous users who carry a mobile terminal 3.

In the vehicle dispatch information data server 1, when a vehicle dispatch request is received from a user, a dispatched vehicle 4 is selected from among the plurality of dispatched vehicles 4*n*, a boarding location/drop-off spot for the user who has transmitted the vehicle dispatch request is determined, and a travel route from the current location of the dispatched vehicle 4 is calculated. An instruction to move according to the travel route and a stop position where the user will be picked up/dropped off is then transmitted from the vehicle dispatch information data server 1 to the in-vehicle onboard unit 2 of the selected dispatched vehicle 4. Furthermore, an instruction to display vehicle dispatch service information, which is the boarding location, the drop-off spot, etc., added to a road map, is transmitted from the vehicle dispatch information data server 1 to the in-vehicle onboard unit 2 of the selected dispatched vehicle 4 and the mobile terminal 3 that had transmitted the vehicle dispatch request information.

The in-vehicle onboard unit 2 is installed in one dispatched vehicle 4 or a plurality of dispatched vehicles 4*n* within a predetermined vehicle dispatch service area. The dispatched vehicle 4 in this embodiment is a service vehicle that provides a movement service in accordance with a user's request, and may be a gasoline vehicle in which gasoline is replenished by refueling, or an electric automobile in which electricity is replenished by charging. The vehicle may also be a vehicle driven by a driver, an autonomously driven vehicle that travels under autonomous driving with a driver having been picked up, or an unmanned vehicle that does not pick up a driver. In the present example, from this point onward, the vehicle is assumed to be an autonomously driven vehicle that travels under autonomous driving with a driver having been picked up.

When the in-vehicle onboard unit 2 of the one dispatched vehicle 4 or the plurality of dispatched vehicles 4*n* calculates a vehicle position, vehicle information including the vehicle position is transmitted from the in-vehicle onboard unit 2 to the vehicle dispatch information data server 1. When the in-vehicle onboard unit 2 of the selected dispatched vehicle 4 receives a movement instruction from the vehicle dispatch information data server 1, autonomous driving control is performed, in which the dispatched vehicle 4 is caused to travel/stop according to the travel route/boarding location/drop-off spot. Additionally, when the in-vehicle onboard unit 2 of the selected dispatched vehicle 4 receives a display instruction from the vehicle dispatch information data server 1, vehicle dispatch service information, which is a boarding location, drop-off spot, etc., added to a road map, is presented.

The mobile terminal 3 is a smartphone or another portable information terminal participating in the vehicle dispatch service network as a user that receives the vehicle dispatch service, by implementing application software of the vehicle dispatch service. The mobile terminal 3 is one example of a user terminal that a user owns.

When a user uses the vehicle dispatch service traveling to a destination via a dispatched vehicle 4, a vehicle dispatch service application is selected by the mobile terminal 3 and a request input screen is displayed on a display screen 401. When a vehicle dispatch request is inputted by user operation on the request input screen, vehicle dispatch request information is transmitted to the vehicle dispatch information data server 1. Having received the vehicle dispatch request information, the vehicle dispatch information data server 1 executes processes such as selecting a dispatched vehicle 4 that conforms to a vehicle dispatch request condition, calculating a travel route, and determining a boarding location/drop-off spot, and transmits the process results to the mobile terminal 3. The mobile terminal 3, having received the process results from the vehicle dispatch information data server 1, then displays vehicle dispatch service information, which is the boarding location, the drop-off spot, etc., added to a road map, on the display screen 401.

Figure 2:
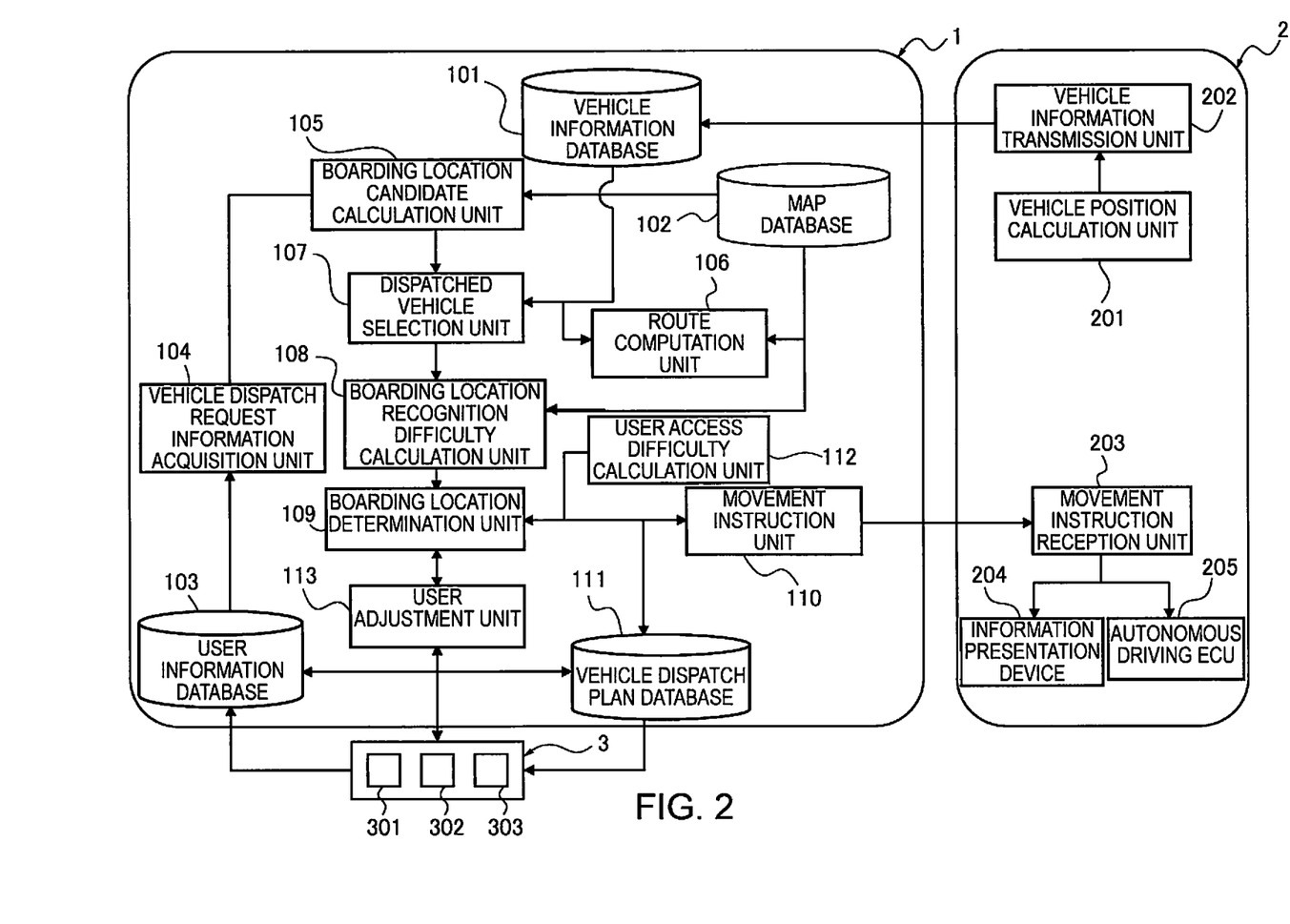
FIG. 2 is a block diagram of a vehicle dispatch information data server, an in-vehicle onboard unit, and a mobile terminal in the vehicle dispatch service network.

Detailed Configurations of Vehicle Dispatch Information Data Server/In-Vehicle Onboard Unit/Mobile Terminal FIG. 2 shows the detailed configurations of the vehicle dispatch information data server 1, the in-vehicle onboard unit 2, and the mobile terminal 3 in the vehicle dispatch service network. The detailed configurations of the vehicle dispatch information data server 1, the in-vehicle onboard unit 2, and the mobile terminal 3 are described below based on FIG. 2.

Detailed Configuration of Vehicle Dispatch Information Data Server

The vehicle dispatch information data server 1 is provided with a vehicle information database 101, a map database 102, a user information database 103, a vehicle dispatch request information acquisition unit 104, a boarding location candidate calculation unit 105, and a route computation unit 106, as shown in FIG. 2. Also provided are a dispatched vehicle selection unit 107, a boarding location recognition difficulty calculation unit 108, a boarding location determination unit 109, a movement instruction unit 110, a vehicle dispatch plan database 111, a user access difficulty calculation unit 112, and a user adjustment unit 113.

The vehicle information database 101 is a database that retains vehicle information sent from a vehicle information transmission unit 202 of the in-vehicle onboard unit 2. When a plurality of dispatched vehicles 4*n* are present as the dispatched vehicle 4, vehicle information from all of the dispatched vehicles 4*n* present in a predetermined service area is stored in this database.

In this embodiment, the "vehicle information" includes at least position information of the dispatched vehicle 4, but also includes the orientation of the vehicle, vehicle speed, the door lock, the opened/closed state of the door, a seatbelt sensor value, whether or not the vehicle is being autonomously driven, and other various vehicle states. Information related to vehicle dispatching is also retained in association with the same vehicle ID, such as whether or not a vehicle dispatch request can be received, whether or not a transfer is underway, whether or not there are any occupants and the number thereof, pick-up/drop-off status, and whether or not the destination of the movement instruction has been reached.

The map database 102 includes information on areas or locations where users can be picked up in addition to a navigation map such as, for example, an open street map, which includes at least link information for roads on which vehicles can travel. In addition, information on drop-off spots, information on locations to wait for vehicles, and pedestrian road link information for calculating routes on which users walk may be included.

The map database 102 may retain targets that users can visually recognize as points on a map. A target that users can visually recognize is referred to below as a "point of interest (POI)." In addition to facility and store information included in the navigation map, POIs may include anything that is a target that can be visually recognized by users. For example, signs, bus stops, fire hydrants, etc., are included. Furthermore, characteristic terrains or road shapes may be included; for example, any terrain or road shape that allows a user to recognize the location, such as a hilltop, an intersection, or a road junction, may be included.

When the map database 102 does not include POIs, locations that users can recognize may be registered in advance in the map database 102 as candidate boarding locations. A boarding location having a low boarding location recognition difficulty will thereby assuredly be selected.

The user information database 103 receives the user's vehicle dispatch request from the mobile terminal 3 and retains the received vehicle dispatch request information. The user's vehicle dispatch plan information is also received from the vehicle dispatch plan database 111 and stored.

The vehicle dispatch request information acquisition unit 104 acquires vehicle dispatch request information for users stored in the user information database 103 and sends the information to the boarding location candidate calculation unit 105. The timing at which vehicle dispatch request information is acquired from the user information database 103 may be the time when a vehicle dispatch request from a new user is received, and existing users in the system may be periodically confirmed and implemented.

The boarding location candidate calculation unit 105 calculates boarding location candidates based on position information for a starting spot of the user, which is included in the vehicle dispatch request acquired by the vehicle dispatch request information acquisition unit 104, and information on locations where the user can be picked up included in the map database 102, and sends the candidates to the dispatched vehicle selection unit 107.

The specific method for calculating boarding location candidates shall now be described. A plurality of candidate spots where the user can be picked up are registered in advance in the map database 102, and boarding locations within a certain range surrounding the user's starting spot are preferably designated as boarding location candidates. In this embodiment, the certain range may be, for example, a circle having a 500 m radius, and boarding locations that the user can arrive at within a certain time, e.g., 5 minutes, may be designated using walking route information included in the map database 102. Additionally, when there are few boarding location candidates within the certain range, the range may be expanded, and conversely, when there are too many, the range may be narrowed.

The route computation unit 106 is called from the dispatched vehicle selection unit 107, and the route computation unit 106 provides a function of performing route calculation from the current position of the dispatched vehicle 4 to the boarding location and calculating the time required for movement, using route information included in the map database 102.

When a walking route is included in the map database 102, a pedestrian route between the user starting spot and the boarding location may also be calculated and a user access time may also be calculated. The route calculation in the route computation unit 106 may use a commonly used technique such as an "open source routing machine (OSRM)," which is a route search application.

The dispatched vehicle selection unit 107 selects an optimal dispatched vehicle 4 using the route calculation function of the route computation unit 106 based on the boarding location candidate information sent from the boarding location candidate calculation unit and the position information of the plurality of dispatched vehicles $4n$ stored in the vehicle information database 101, and sends the optimal dispatched vehicle 4 to the boarding location recognition difficulty calculation unit 108.

The method for selecting the dispatched vehicle 4 preferably involves simply selecting the vehicle closest to the user's starting spot included in the vehicle dispatch request information. Additionally, the vehicle that can be most easily reached may be selected using the route computation unit 106 for each boarding location candidate.

The boarding location recognition difficulty calculation unit 108 first extracts peripheral POIs present in in the periphery of the boarding location candidates based on the boarding location candidates sent from the dispatched vehicle selection unit 107 and POI information included in the map database 102. Boarding location recognition difficulties R of the boarding location candidates are then calculated and sent to the boarding location determination unit 109.

In the extraction of the peripheral POIs, all POIs present within a certain range (e.g., a 100 m radius) of the boarding location may be selected, the nearest POI may be selected, or a plurality of POIs may be extracted in order of closeness. The method for calculating the boarding location recognition difficulties R shall next be described.

In simple terms, preferably, a boarding location recognition difficulty R is determined as 0 or 1 in accordance with whether or not a POI is present within a certain distance (e.g., 10 m) of the boarding location is determined, i.e. R=0 when a POI is present and R=1 when a POI is not present.

The boarding location recognition difficulty R may be calculated based on a positional relationship between the boarding location and the peripheral POI. For example, using X(m) to denote a distance to the nearest POI and C(m) to denote a distance at which recognition difficulty reaches a maximum, the boarding location recognition difficulty R is preferably calculated as R=X/C (X<C), R=1 (X≥C), etc. Specifically, with C being 100 m, R=0.1 if it is 10 m to the nearest POI, R=0.9 if it is 90 m, and the boarding location recognition difficulty R is set commensurately lower with respect to shorter distances. The above calculation formula is one example; any technique may be used as long as the boarding location recognition difficulty R is calculated based on a positional relationship with the peripheral POI.

The boarding location recognition difficulty R may be calculated based on a recognition difficulty Rp of the peripheral POI. For the recognition difficulty Rp of the peripheral POI, for example, a numerical value of 0 to 1 is preferably registered in accordance with the recognition difficulty Rp, in association with a POI registered in the map database 102 in advance. The recognition difficulty Rp may be calculated by subjective evaluation or by computation based on size and height of the POI. The boarding location recognition difficulty R may also simply be R=Rp, and a correction may be applied by taking into account the distance between the peripheral POI and the boarding location.

The boarding location recognition difficulty R may be calculated based on a specificity S of the peripheral POI. The specificity S of the POI is an index of how accurately the user can specify the location. For example, when the POI is "Tokyo Station," the range represented by the POI expands to a radius of about 200 m, and the specificity S is low. When the POI is "Tokyo Station, Exit A1," the range represented by the POI decreases to a radius of about 5 m, and the specificity S is high. For the specificity S, a numerical value of 0 to 1 is preferably registered in accordance with, for example, a specific degree, in association with a POI registered in the map database 102 in advance. The specificity S may be calculated by subjective evaluation, or by computation so that the specificity S commensurately increases with respect to a smaller POI range, based on the range represented by the POI. The boarding location recognition difficulty R may also simply be R=1−S, and a correction may be applied by taking into account the distance between the peripheral POI and the boarding location.

The boarding location determination unit 109 determines a final boarding location based on the boarding location candidates sent from the boarding location recognition difficulty calculation unit 108 and the boarding location recognition difficulties R of the boarding location candidates, and sends the boarding location and the information of the dispatched vehicle 4 to the movement instruction unit 110 and the vehicle dispatch plan database 111. For the boarding location, a boarding location candidate having a low boarding location recognition difficulty (the boarding location candidate for which the value of the boarding location recognition difficulty R is lowest) is preferably selected from among the boarding location candidates.

The boarding location determination unit 109 also includes the user access difficulty calculation unit 112, and may determine the final boarding location based on a user access difficulty D and the boarding location recognition difficulty R. Specifically, with the user access difficulty D and the boarding location recognition difficulty R each calculated at 0 to 1, the boarding location for which the sum of the two difficulties (D+R) is a minimum is preferably selected. Either index may be emphasized by using a weighted sum instead of a simple sum.

The boarding location determination unit 109 also includes the user adjustment unit 113, and with a plurality of boarding location candidates with low boarding location recognition difficulties having been sent to the user adjustment unit 113, the user's selection result may be sent from the user adjustment unit 113 and the boarding location selected by the user may be selected as the final boarding location.

Using the boarding location and dispatched vehicle information sent from the boarding location determination unit 109 and the vehicle information included in the vehicle information database 101, the movement instruction unit 110 calculates a route to the next destination using the route computation function of the route computation unit 106. A movement instruction to move the dispatched vehicle 4 is transmitted to a movement instruction reception unit 203 of the in-vehicle onboard unit 2.

The vehicle dispatch plan database 111 receives the boarding location and dispatched vehicle information sent from the boarding location determination unit 109, and stores the spot and information as a vehicle dispatch plan. Furthermore, vehicle dispatch plan information for each user is sent to the user information database 103 and the vehicle dispatch plan information is transmitted to the mobile terminal 3 carried by the user.

The user access difficulty calculation unit 112 calculates the user access difficulty D between the starting spot and the boarding location candidate using the information of the individual boarding location candidate and the user's starting spot included in the vehicle dispatch request information. The user access difficulty is preferably calculated by scoring evaluation items such as, for example, distance, arrival time, presence/absence of stairs to climb, and comfort of the boarding location from 0 to 1, and calculating the difficulty using a weighted average of the scores of the items. These evaluation items are each an example, and other items may be included.

The user adjustment unit 113 transmits the plurality of boarding location candidates sent from the boarding location determination unit 109 to the mobile terminal 3. At this time, in addition to the names and positions of the peripheral POIs associated with the boarding location candidates, additional information such as the relative positional relationship between the boarding location candidate and the peripheral POI may be transmitted as well. The information of the boarding location selected by the user is received from the mobile terminal 3 and sent to the boarding location determination unit 109.

Detailed Configuration of In-Vehicle Onboard Unit

The in-vehicle onboard unit 2 has a vehicle position calculation unit 201, the vehicle information transmission unit 202, the movement instruction reception unit 203, an information presentation device 204, and an autonomous driving ECU 205, as shown in FIG. 2. The information presentation device 204 and the autonomous driving ECU 205 are both present, but the configuration may include either one alone.

The vehicle position calculation unit 201 calculates the position of the dispatched vehicle 4 and sends the position to the vehicle information transmission unit 202. The vehicle position calculation unit 201 is an ECU connected to, for example, a GPS/INS sensor, and this ECU preferably sends latitude/longitude position information outputted from the GPS/INS sensor at certain time intervals (e.g., 100 msec). For example, map matching based on a map or another technique that can specify position may be used as the method for calculating the position information.

The vehicle information transmission unit 202 is an in-vehicle device provided with, for example, a 4G/LTE mobile communication function, and is connected to the vehicle position calculation unit 201 by a CAN, a LAN, etc. The vehicle information sent from the vehicle position calculation unit 201 is transmitted to the vehicle information database 101 of the vehicle dispatch information data server 1 at certain intervals (e.g., 100 msec).

Though not shown in FIG. 1, the vehicle information transmission unit 202 is also connected to the vehicle CAN and another sensor, and upon acquiring the orientation of the vehicle, vehicle speed, the door lock, the opened/closed state of the door, a seatbelt sensor value, whether or not the vehicle is being autonomously driven, and other various vehicle states, the vehicle information transmission unit 202 may transmit these states as vehicle information.

The movement instruction reception unit 203 is an in-vehicle device provided with, for example, a 4G/LTE mobile communication function, and the movement instruction reception unit 203 sends route information transmitted from the movement instruction unit 110 of the vehicle dispatch information data server 1 to the information presentation device 204 and the autonomous driving ECU 205, which are connected by a CAN, a LAN, etc. The movement instruction reception unit 203 may be integrated in terms of function with the vehicle information transmission unit 202, which is similarly provided with a function for communicating with the vehicle dispatch information data server 1.

The information presentation device 204 is, for example, a display device installed in a position visible to the driver or occupant in the vehicle interior, and the device 204 displays route information received from the movement instruction reception unit 203 via software implemented as an application. Specifically, with, for example, a map displayed on the screen, a process is performed in which, inter alia, the destination included in the route information is displayed by putting a star or another mark on the location of the destination, and routes (a group of latitude/longitude points) are connected by lines and drawn to display a route. Additionally, information may be presented using a voice as necessary, such as making a sound to draw attention when a new route is received.

The autonomous driving ECU 205 travels to the destination under autonomous driving based on the route information sent from the movement instruction reception unit 203. The method of realizing autonomous driving involves controlling vehicle motion so as to move along a computed route via commonly known driving/braking/steering.

Though not shown in FIG. 1, the autonomous driving ECU 205 may manage route reception completion, moving, destination arrival, and other vehicle dispatch movement statuses, and send the statuses to the vehicle information transmission unit 202.

Detailed Configuration of Mobile Terminal 3

The mobile terminal 3 has a display screen 301, a user application unit 302 on which vehicle dispatch service application software is installed, and a communication unit 303 that transmits and receives signals to and from the vehicle dispatch information data server 1, as shown in FIG. 2.

The user application unit 302 transmits a vehicle dispatch request, described below, to the user information database 103 of the vehicle dispatch information data server 1 based on input from the user.

The vehicle dispatch request information includes at least position information of the user's starting spot. The position information of the user's starting spot may be current location information acquired from GPS, or the information may be acquired as a designated pick-up point by input from the user. In addition to the vehicle dispatch request information, additional information such as drop-off spot, designation of a waypoint, number of passengers, baggage information, request time, desired pick-up time, and carpooling availability may be further included. In the present example, the vehicle dispatch request information was described as including all of the pieces of information listed above.

The user application unit 302 receives vehicle dispatch plan information, described below, from the movement instruction unit 110 of the vehicle dispatch information data server 1, and presents this information to the user on the display screen 301.

The vehicle dispatch plan information includes at least information on the boarding location and the vehicle allocated to the user. In addition, the travel route of the vehicle and other additional information may also be included as vehicle dispatch plan information.

The user application unit 302 also presents the plurality of boarding location candidates received from the user adjustment unit 113 to the user on the display screen 301, and when the user has selected one, the selection result may be transmitted to the user adjustment unit 113.

The user application unit 302 may present to the user peripheral POI information for each boarding location candidate received from the user adjustment unit 113 when a plurality of boarding location candidates are presented to the user by the display screen 301. As the method of presenting peripheral POI information, the name of the POI may be written in text, or the position of the POI may be indicated on a map.

When the mobile terminal 3 presents a plurality of boarding location candidates to the user via the display screen 301, the mobile terminal 3 may present to the user position information relative to the peripheral POI for each boarding location candidate received from the user adjustment unit 113. The position information relative to the peripheral POI may indicate, for example, the direction and distance from the nearest POI to the boarding location, or may indicate the distance from a plurality of POIs in the vicinity. Specifically, when, for example, the peripheral POIs include a convenience store and a post office, any realization method may be used as long as the user can understand the positional relationship relative to the POI, such as "100 m east from the convenience store," "between the convenience store and the post office," and "across the road from the post office."

"Background technology and problem-solving measures" shall next be described. "Boarding location determination action in vehicle dispatch service" in the first embodiment shall then be described.

Referring to the system disclosed in Patent Document 1 as the background technology, in the background technology, a recommended boarding location is selected using an access difficulty for a user and an access difficulty for an autonomously driven vehicle. Specifically, the recommended boarding location of the background technology is determined based on an "ease of user access" and an "ease of stopping the dispatched vehicle," and "ease of recognition for user" is not taken into consideration.

Figure 3:
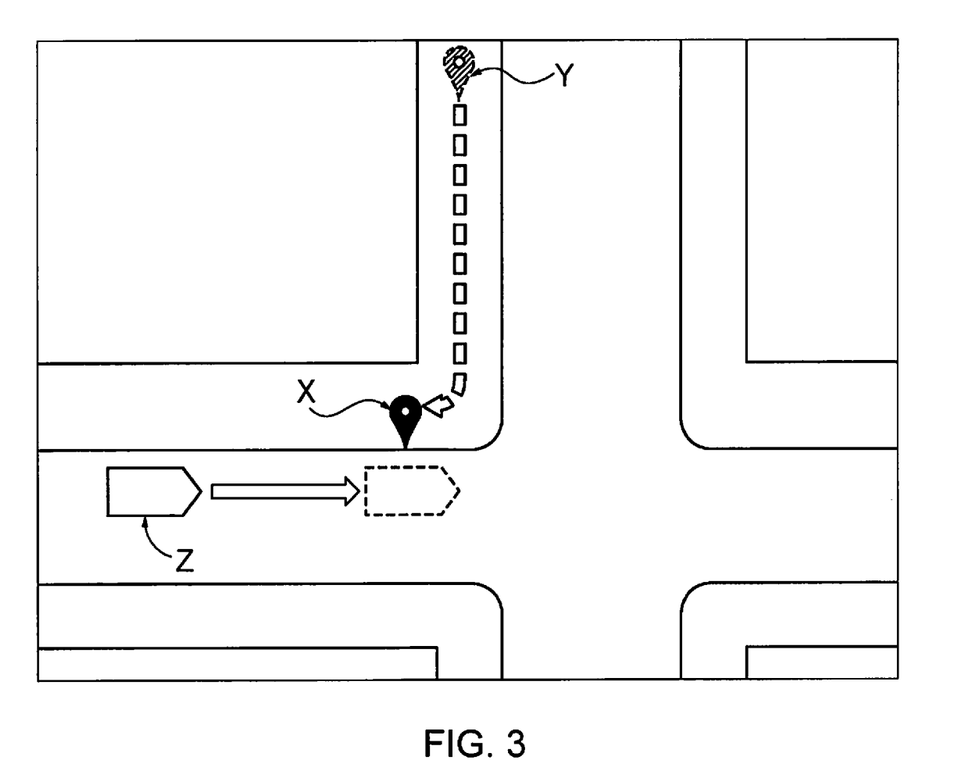
FIG. 3 is an explanatory drawing of a boarding location determination action, showing the concept of the boarding location determination action of a vehicle dispatch service in the background technology.

Thus, in the background technology, the recommended boarding location is determined based on the "ease of user access" and the "ease of stopping the dispatched vehicle," whereby only guidance to the recommended boarding location as a point on a map is given to the user. Therefore, there is at least a position shift in GPS accuracy of the mobile terminal carried by the user, and there are cases in which GPS accuracy of the mobile terminal significantly worsens in an urban area where high-rise buildings are lined up. In the background technology, for example, as shown in FIG. 3, a user who has made a vehicle dispatch request near an intersection in an urban area where buildings are lined up will aim for a boarding location X while relying on the GPS and map of a mobile terminal. In this case, the effect of multipath due to radio wave reflection on buildings, etc., causes the GPS accuracy of the mobile terminal to drop to the order of several tens of meters. Therefore, even if the user correctly arrives at a boarding location Y displayed on the mobile terminal, the arrival position of the user is deviated from the boarding location X by the GPS accuracy of the mobile terminal. Therefore, after a dispatched vehicle Z arrives at the stop position (broken line position), the user will hurry to move an erroneous distance corresponding to the GPS accuracy between the boarding location X and the boarding location Y.

As such, in the background technology in which a boarding location is determined using the access difficulty for the dispatched vehicle and the access difficulty for the user, it is difficult for the user to correctly arrive at the boarding location where the dispatched vehicle will stop. In particular, problems have been presented in station-free vehicle dispatch services, which can pick up and drop off users anywhere, in that the user cannot appropriately recognize the boarding location because there is no physical landmark at the boarding location.

Concerning the problems described above, the present disclosure focuses on "ease of recognition for user" being more important than "ease of user access" and "ease of stopping the dispatched vehicle," and determines a boarding location for the dispatched vehicle of the user who made the vehicle dispatch request. A problem-solving measure is a vehicle dispatch service boarding location determination method that includes the vehicle dispatch information data server 1, the in-vehicle onboard unit 2, and the mobile terminal 3, which exchange information by wireless communication, and that determines a boarding location where the user who made the vehicle dispatch request will be picked up by the dispatched vehicle 4, the procedure being as follows. When there is a vehicle dispatch request from a user, position information of a vehicle dispatch request point is acquired. Boarding location candidates in the periphery of the vehicle dispatch request point are calculated based on the vehicle dispatch request point and map information. A boarding location recognition difficulty R, which is the difficulty for the user to recognize the spot as a boarding location, is calculated for each of the boarding location candidates. A boarding location candidate having a low boarding location recognition difficulty R among the boarding location candidates is determined as the boarding location where the user will be picked up by the dispatched vehicle 4.

Specifically, a boarding location recognition difficulty R, which is the difficulty for a user to recognize the spot as a boarding location, is calculated for each of the boarding location candidates, and among the boarding location candidates, a boarding location candidate that has a low boarding location recognition difficulty R and that is easily recognized by the user is determined as the boarding location for the user being picked up by the dispatched vehicle 4.

Figure 4:
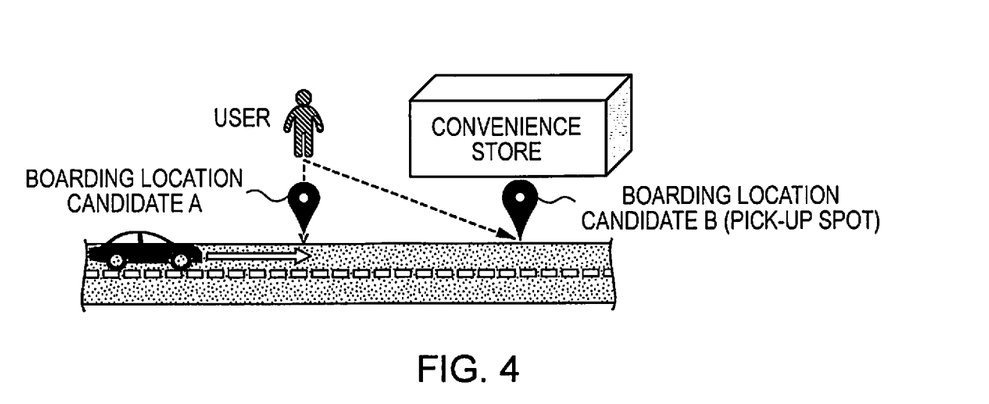
FIG. 4 is an explanatory drawing a boarding location determination action, showing the concept of the boarding location determination action of a vehicle dispatch service in the first embodiment.

Therefore, when there is a vehicle dispatch request from a user, an appropriate boarding location at which the user can correctly arrive can be determined from among boarding location candidates. For example, in a scenario such as is shown in FIG. 4, when access difficulty for the user and access difficulty for the dispatched vehicle are taken into consideration, a boarding location candidate A would be determined as the boarding location. By contrast, in the problem-solving measure, a boarding location candidate B having a low boarding location recognition difficulty R is determined as the boarding location. As such, when the user moves from the starting spot to the boarding location candidate B, there is a convenience store which is target POI that the user can see, and the boarding location candidate B can therefore be easily reached.

Boarding location Determination Action in Vehicle Dispatch Service

Figure 5:
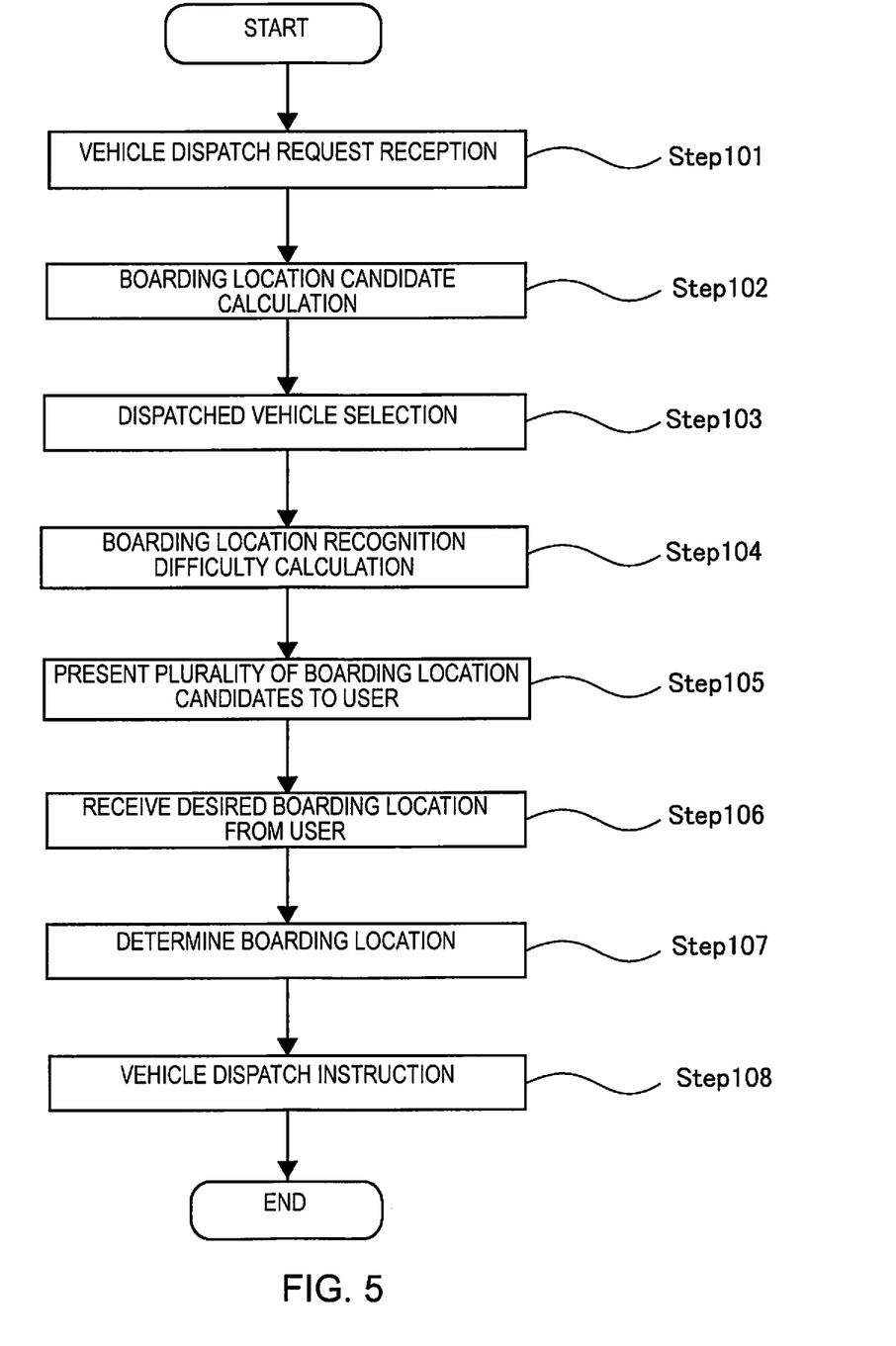
FIG. 5 is a flowchart of a flow of a boarding location determination control process of a vehicle dispatch service executed by the vehicle dispatch information data server.

FIG. 5 shows a flow of a boarding location determination control process of the vehicle dispatch service executed by the vehicle dispatch information data server 1. The boarding location determination action in the vehicle dispatch service shall be described below based on FIG. 5.

In Step 101, a vehicle dispatch request is received from the mobile terminal 3 and stored in the user information database 103, after which the process advances to Step 102.

In Step 102, the vehicle dispatch request information acquisition unit 104 acquires the user's vehicle dispatch request information stored in the user information database 103, after which the boarding location candidate calculation unit 105 calculates boarding location candidates and the process advances to Step 103.

In Step 103, the dispatched vehicle selection unit 107 selects a vehicle to be dispatched to a boarding location candidate calculated by the boarding location candidate calculation unit 105, and the process advances to Step 104.

In Step 104, the boarding location recognition difficulty calculation unit 108 calculates the boarding location recognition difficulties R of the boarding location candidates based on the position information of the boarding location candidates and the POI information included in the map database 102, and the process advances to Step 105.

In Step 105, the boarding location determination unit 109 presents to the user a plurality, e.g., two boarding location candidates via the user adjustment unit 113 and the mobile terminal 3 based on the boarding location recognition difficulties R, and the process advances to Step 106.

In Step 106, the mobile terminal 3 receives a boarding location selection result by user input and sends the result to the user adjustment unit 113, and the process advances to Step 107.

In Step 107, the boarding location determination unit 109 determines the final boarding location based on the user input result sent from the user adjustment unit 113, and the process advances to Step 108.

In Step 108, the movement instruction unit 110 issues a vehicle dispatch instruction to the dispatched vehicle 4 based on the boarding location information determined by the boarding location determination unit 109, and the process is ended.

Thus, in the boarding location determination control process of the vehicle dispatch service, when the mobile terminal 3 receives a vehicle dispatch request, in the vehicle dispatch information data server 1, a dispatched vehicle 4 is selected and a plurality of boarding location candidates are calculated based on boarding location recognition difficulties R. When a plurality of calculated boarding location candidates are subsequently presented to the user by transmission to the mobile terminal 3, a boarding location is selected by user input. When the vehicle dispatch information data server 1 subsequently receives the selection result from the mobile terminal 3, a boarding location is determined in the boarding location determination unit 109 of the vehicle dispatch information data server 1 and a vehicle dispatch instruction is transmitted from the movement instruction unit 110 to the dispatched vehicle 4.

The process flow described above is merely one example, and other process flows may be adopted. For example, in Step 105, a boarding location uniquely determined by the boarding location determination unit 109 may be transmitted instead of the user adjustment unit 113 presenting a plurality of boarding locations to the user, and in Step 106, the user may input to accept or cancel a boarding location instead of choosing a boarding location.

As described above, the effects listed below are exhibited in the vehicle dispatch service boarding location determination method and the vehicle dispatch service boarding location determination system of the first embodiment.

(1) A vehicle dispatch service boarding location determination method comprising a vehicle dispatch information data server 1, an in-vehicle onboard unit 2 (in-vehicle terminal), and a mobile terminal 3 (user terminal), which exchange information by wireless communication, the method determining a boarding location where a user who has requested a vehicle dispatch will be picked up by a dispatched vehicle 4, wherein information on a position of a vehicle dispatch request point is acquired when there is a vehicle dispatch request from the user, boarding location candidates present in a periphery of the vehicle dispatch request point are calculated based on the vehicle dispatch request point and map information, boarding location recognition difficulties R, which are degrees of difficulty for the user to recognize the boarding location candidates as a boarding location, are calculated, and of the boarding location candidates, a boarding location candidate for which the boarding location recognition difficulty R is low is determined as the boarding location where the user will be picked up by the dispatched vehicle 4 (FIG. 4). As such, when the boarding location recognition difficulties R, which are degrees of difficulty for the user to recognize boarding locations, have been calculated, the boarding location recognition difficulties are taken into consideration to determine a boarding location. Therefore, it is possible to provide a vehicle dispatch service boarding location determination method that determines an appropriate boarding location that the user can correctly arrive at from among boarding location candidates when there is a vehicle dispatch request from the user.

(2) Based on a map database 102 in which targets (POIs) visible to the user are registered as points on a map, information on peripheral targets (peripheral POI information) present in the peripheries of the boarding location candidates is extracted; and the boarding location recognition difficulties R for the boarding location candidates are extracted based on the peripheral target information (peripheral POI information) (FIG. 2). As such, the boarding location recognition difficulties R are calculated based on the peripheral target information (peripheral POI information) for the boarding location peripheries, using the map database 102 in which targets (POIs) visible to the user are registered as points on a map. In other words, a boarding location associated with a target (POI) visible to the user is selected. Therefore, the user can correctly arrive at the boarding location by moving toward a target (POI) visible to the user.

(3) The boarding location recognition difficulties R for the boarding location candidates are calculated based on positional relationships between the boarding location candidates and the peripheral targets (peripheral POIs) (FIG. 2). As such, the boarding location recognition difficulties R are calculated based on the positional relationships between the boarding location candidates and the peripheral targets (peripheral POIs). Therefore, it is possible to preferentially select a boarding location close to a target (POI) that is a landmark for the user.

(4) Recognition difficulties Rp of targets (POIs) stored in the map database 102 and visible to the user are calculated, and the boarding location recognition difficulties R for the boarding location candidates are calculated based on the recognition difficulties Rp of the peripheral targets (peripheral POIs) (FIG. 2). As such, the boarding location recognition difficulties R for the boarding location candidates are calculated based on the recognition difficulties Rp of the peripheral targets (peripheral POIs). Therefore, it is possible to preferentially select a boarding location associated with a target (POI) that is easier for the user to perceive as a landmark.

(5) Calculations are made of specificities S for which the narrowness of ranges indicated by targets (POIs) stored in the map database 102 and visible to the user is adopted as an index, and the boarding location recognition difficulties R for the boarding location candidates are calculated based on the specificities S of the peripheral targets (peripheral POIs) (FIG. 2). As such, specificities S using the narrowness of ranges indicated by targets (POIs) as indexes are calculated, and the boarding location recognition difficulties R are calculated based on the specificities S of the peripheral targets (peripheral POIs) of the boarding location candidates. Therefore, it is possible to preferentially select a boarding location associated with a target (POI) of which the location is easy for the user to specify. The specificity S of a peripheral target (peripheral POI) shall be described here in a specific example. For "Tokyo Station," the specificity S is low and it is unclear where the user should go, but for "Exit A1 of Tokyo Station," the specificity S increases. In other words, the specificity S increases commensurately with respect to a narrowing in the range of the area indicated by the target (POI) on the map.

(6) User access difficulties D between the user request point and the boarding location candidates are calculated, and when a boarding location is determined from among the boarding location candidates, the boarding location is determined taking into account the user access difficulties D in addition to the boarding location recognition difficulties R (FIG. 2). As such, a boarding location is determined taking into account both the boarding location recognition difficulties and the user access difficulties between the user request point and the boarding location candidates. Therefore, a boarding location is selected which has a balance of both indexes of ease of recognizing the boarding location and ease of access for the user.

(7) Targets (POIs) stored in the map database include characteristic terrains and road shapes in addition to targets (POI) visible to the user. As such, targets (POIs) include, in addition to physical objects such as facilities and stores, locations such as intersections and hilltops that do not necessarily have physical objects but that can be recognized and identified by the user. Therefore, it is possible to select, as the boarding location, a location that the user can recognize or the periphery of a location that the user can identify.

(8) When a boarding location is determined from among a plurality of boarding location candidates, the user is notified of the plurality of boarding location candidates, and the boarding location candidate selected by the user is determined as a final boarding location (FIG. 2). As such, the system proposes boarding location candidates and entrusts the user with the right to determine the final boarding location. Therefore, user needs that the system cannot fully grasp can be finely reflected to determine the boarding location.

(9) When the user is notified of the plurality of boarding location candidates, peripheral target information (POI information) for each boarding location candidate is presented (FIG. 2). As such, when the user is notified of boarding location candidates, peripheral target information (POI information) for each boarding location candidate is presented. Therefore, the user can select the final boarding location after confirming whether or not the target POI) is one that the user can recognize, and when the user heads to the boarding location, the user can reach the boarding location correctly by moving toward the target (POI).

(10) When the user is notified of the plurality of boarding location candidates, information on a relative position from the peripheral target (peripheral POI) for each boarding location candidate is presented (FIG. 2). As such, when the user is notified of boarding location candidates, information on the relative position from the peripheral target (peripheral POI) for each boarding location candidate is presented. Therefore, the user can select the final boarding location after assessing how easy it is to understand where the boarding location is, including the relative position from the target (POI). In this case, the relative position from the peripheral target (peripheral POI) is, for example, "in front of a convenience store," "100 m east from a bus stop," etc.

(11) The dispatched vehicle 4 is provided with an autonomous driving function for traveling under autonomous driving to a pick-up point and a drop-off point in accordance with a vehicle dispatch request from the user (FIG. 1). As such, because the dispatched vehicle 4 travels under autonomous driving, the vehicle can arrive by pinpoint at the designated boarding location regardless of the difficulty the driver has in recognizing the boarding location. Therefore, if the user can get to the boarding location correctly, the user can be smoothly picked up by the dispatched vehicle 4.

(12) The vehicle dispatch information data server 1: acquires information on a vehicle dispatch request point at which the user made a vehicle dispatch request when the vehicle dispatch request is received from the mobile terminal 3 (user terminal); calculates boarding location candidates present in a periphery of the vehicle dispatch request point based on the vehicle dispatch request point and map information; calculates boarding location recognition difficulties R, which are degrees of difficulty for the user in recognizing the boarding location candidates as the boarding location; determines a boarding location candidate for which the boarding location recognition difficulty R is low among the boarding location candidates as the boarding location where the user will be picked up by the dispatched vehicle 4; and transmits a movement instruction to the in-vehicle onboard unit 2 (in-vehicle terminal) installed in the dispatched vehicle 4, instructing the vehicle to move from a current location to the determined boarding location, when the boarding location is determined (FIG. 5). Therefore, the vehicle dispatch service can be integratedly managed by the vehicle dispatch information data server 1 by sharing all processing functions in the vehicle dispatch information data server 1, which receives the vehicle dispatch request from the mobile terminal 3 (user terminal). Furthermore, the processing load in the in-vehicle onboard unit 2 (in-vehicle terminal) of the dispatched vehicle 4 can be reduced.

(13) The mobile terminal 3 (user terminal): transmits a vehicle dispatch request to the vehicle dispatch information data server 1; receives information on a boarding location transmitted based on a process performed by the vehicle dispatch information data server 1 when the vehicle dispatch request is transmitted; and displays a position of the boarding location along with a map on a display screen 301 when the information on the boarding location is received (FIG. 1). As such, information on the boarding location where the user can correctly arrive is received and displayed on the display screen 301 merely by transmitting a vehicle dispatch request to the vehicle dispatch information data server 1. Therefore, it is possible to reduce the operational burden on users who use the vehicle dispatch service.

(14) A vehicle dispatch service boarding location determination system comprising a vehicle dispatch information data server 1, an in-vehicle onboard unit 2 (in-vehicle terminal), and a mobile terminal 3 (user terminal), which exchange information by wireless communication, the system determining a boarding location where a user who has requested a vehicle dispatch will be picked up by a dispatched vehicle 4, the vehicle dispatch service boarding location determination system characterized in that the vehicle dispatch information data server 1 has: a vehicle dispatch request information acquisition unit 104 that acquires information on a position of a vehicle dispatch request point when there is a vehicle dispatch request from the user; a boarding location candidate calculation unit 105 that calculates boarding location candidates present in a periphery of the vehicle dispatch request point based on the vehicle dispatch request point and a map database 102; a boarding location recognition difficulty calculation unit 108 that calculates boarding location recognition difficulties R, which are degrees of difficulty for the user to recognize the boarding location candidates as the boarding location; and a boarding location determination unit 109 that determines a boarding location candidate for which the boarding location recognition difficulty R is low among the boarding location candidates as the boarding location where the user will be picked up by the dispatched vehicle 4 (FIG. 2). Therefore, it is possible to provide a vehicle dispatch service boarding location determination system that, when there is a vehicle dispatch request from a user, determines an appropriate boarding location where the user can correctly arrive at the boarding location from among boarding location candidates.

The vehicle dispatch service boarding location determination method and the vehicle dispatch service boarding location determination system of the present disclosure have been described above based on the first embodiment. However, the first embodiment is not provided by way of limitation on the specific configuration; design changes, additions, etc., are allowed as long as such do not deviate from the scope of the invention as in the claims.

In the first embodiment, the example of the vehicle dispatch information data server 1 presented used both a vehicle management function for a plurality of dispatched vehicles 4n and a user management function in which numerous users carrying mobile terminals 3 are managed. However, for the vehicle dispatch information data server, a vehicle management server given a vehicle management function for a plurality of dispatched vehicles and a user management server given a user management function in which numerous users carrying mobile terminals 3 are managed may be installed in separate facilities, and information may be exchanged between the two servers by wireless communication.

In the first embodiment, an example was presented in which the information presentation device 204 of the in-vehicle onboard unit 2 is realized by a display device installed in the vehicle interior. However, there is no need to limit the information presentation device to a display device; for example, the information presentation device may be realized as a smartphone or as a combination of a display and a personal computer that performs drawing operations. Furthermore, the information presentation device may be realized by implementing the device as an application for a web browser on the server side and accessing the web browser with a tablet, etc.

In the first embodiment, an example was presented in which the mobile terminal 3 was used as the user terminal. However, for example, a home personal computer or a mobile personal computer in which the vehicle dispatch service is implemented as a web application and a request is made via the Internet may be used as the user terminal.

In the first embodiment, an example was presented in which all processing functions are shared in the vehicle dispatch information data server 1, which receives a vehicle dispatch request from the mobile terminal 3 (user terminal). However, some of the processing functions executed by the vehicle dispatch information data server may be shared by the in-vehicle terminal of the dispatched vehicle or the user terminal.

The invention claimed is:

1. A vehicle dispatch service method that uses a terminal and a vehicle dispatch information data server including a map database to determine a boarding location for a dispatched vehicle based on a vehicle dispatch request from the terminal and uses an in-vehicle terminal to autonomously dispatch the dispatched vehicle to the boarding location, the vehicle dispatch service method comprising:
   receiving the vehicle dispatch request, the vehicle dispatch request including position information indicating a starting location of a user who generated the vehicle dispatch request;
   calculating boarding location candidates present within a range surrounding the starting location based on the position information and map information in the map database;
   extracting information on peripheral targets present in peripheries of the boarding location candidates from the map information, each of the peripheral targets being a visible landmark existing within a range of a respective one of the boarding location candidates, the peripheral targets being registered as points on a map in the map information;
   calculating a boarding location recognition difficulty of each of the boarding location candidates based on a predetermined specificity value a respective one of the peripheral targets and a distance between each of the boarding location candidates and the respective one of the peripheral targets such that the boarding location recognition difficulty decreases commensurately as the distance decreases,
      the predetermined specificity value being a numerical value from 0 to 1, inclusive, and set to be larger when a radius of the respective one of the peripheral targets is smaller and smaller when the radius of the respective one of the peripheral targets is larger,
      a base boarding location recognition difficulty being calculated by subtracting the predetermined specificity value from 1, and
      the boarding location recognition difficulty being calculated by applying a correction to the base boarding location recognition difficulty, the correction being based on the distance, the boarding location recognition difficulty being a numerical value expressing a degree of difficulty for the user to visually recognize each of the boarding location candidates; and
   determining at least one of the boarding location candidates having a lower boarding location recognition difficulty than others of the boarding location candidates;
   presenting the at least one of the boarding location candidates to the user via the terminal;
   receiving a selection by the user of one of the at least one boarding location candidates presented via the terminal as the boarding location for the dispatched vehicle; and
   using the in-vehicle terminal to control the dispatched vehicle to move autonomously from a current location to the boarding location that was selected.

2. The vehicle dispatch service method according to claim 1, further comprising
   calculating access difficulties between the starting location and each of the boarding location candidates; and
   determining the boarding location taking into account the access difficulties in addition to the boarding location recognition difficulties of the boarding location candidates.

3. The vehicle dispatch service method according to claim 1, wherein
   the peripheral targets include characteristic terrains and road shapes.

4. The vehicle dispatch service method according to claim 1, wherein
   the presenting the at least one of the boarding location candidates to the user via the terminal includes
   presenting peripheral target information for each of the at least one of the boarding location candidates.

5. The vehicle dispatch service method according to claim 4, wherein
   the presenting the at least one of the boarding location candidates to the user via the terminal includes
   presenting information indicating a relative position of the respective one of the peripheral targets with respect to each of the at least one of the boarding location candidates.

6. The vehicle dispatch service method according to claim 1, wherein
   the vehicle dispatch information data server transmits a movement instruction to the in-vehicle terminal, the movement instruction instructing the in-vehicle terminal to control the dispatched vehicle to move autonomously from the current location to the boarding location.

7. The vehicle dispatch service method according to claim 1, wherein
   the range is a 100 m radius of the respective one of the boarding location candidates.

8. A vehicle dispatch service method that uses a terminal and a vehicle dispatch information data server including a map database to determine a boarding location for a dispatched vehicle based on a vehicle dispatch request from the terminal and uses an in-vehicle terminal installed in the dispatched vehicle to autonomously dispatch the dispatched vehicle to the boarding location, the vehicle dispatch service method characterized in that
   the vehicle dispatch information data server:
   receives the vehicle dispatch request, the vehicle dispatch request including position information indicating a starting location of a user who generated the vehicle dispatch request;

calculates boarding location candidates present within a range surrounding the starting location based on the position information and map information in the map database;

extracts information on peripheral targets present in peripheries of the boarding location candidates from the map information, each of the peripheral targets being a visible landmark existing within a range of a respective one of the boarding location candidates, the peripheral targets being registered as the points on a map in the map information;

calculates a boarding location recognition difficulty of each of the boarding location candidates based on a predetermined specificity value and a distance between each of the boarding location candidates and a respective one of the peripheral targets such that the boarding location recognition difficulty decreases commensurately as the distance decreases, the predetermined specificity value being a numerical value from 0 to 1, inclusive, and set to be larger when a radius of the peripheral target is smaller and smaller when the radius of the peripheral target is larger, a base boarding location recognition difficulty being calculated by subtracting the predetermined specificity value from 1, and the boarding location recognition difficulty being calculated by applying a correction to the base boarding location recognition difficulty, the correction being based on the distance, the boarding location recognition difficulty being a numerical value expressing a degree of difficulty for the user to visually recognize each of the boarding location candidates;

determines one of the boarding location candidates as the boarding location, the one boarding location candidate having a lower boarding location recognition difficulty than others of the boarding location candidates; and transmits a movement instruction to the in-vehicle terminal installed in the dispatched vehicle, the vehicle dispatch service method being further characterized in that the in-vehicle terminal controls the dispatched vehicle to move autonomously from a current location to the boarding location that was determined in response to the movement instruction.

9. The vehicle dispatch service method according to claim 8, wherein
the terminal:
transmits the vehicle dispatch request to the vehicle dispatch information data server;
receives information regarding the boarding location that was determined from the vehicle dispatch information data server; and
displays a position of the boarding location along with a map on a display screen when the information regarding the boarding location is received.

10. The vehicle dispatch service method according to claim 8, wherein
the range is a 100 m radius of the respective one of the boarding location candidates.

11. A vehicle dispatch service network that determines a boarding location for a dispatched vehicle based on a vehicle dispatch request and autonomously moves the dispatched vehicle to the boarding location, the vehicle dispatch service network comprising:
a terminal;
an in-vehicle terminal provided in the dispatched vehicle and configured to control the dispatched vehicle to move autonomously; and
a vehicle dispatch information data server including a map database, the vehicle dispatch information data server being configured to
receive the vehicle dispatch request from the terminal, the vehicle dispatch request including position information indicating a starting location of a user who generated the vehicle dispatch request,
calculate boarding location candidates present within a range surrounding the starting location based on the position information and map information in the map database,
extract information on peripheral targets present in peripheries of the boarding location candidates from the map information, each of the peripheral targets being a visible landmark existing within a range of a respective one of the boarding location candidates, the peripheral targets being registered as points on a map in the map information,
calculate a boarding location recognition difficulty of each of the boarding location candidates based on a predetermined value and a distance between each of the boarding location candidates and a respective one of the peripheral targets such that the boarding location recognition difficulty decreases commensurately as the distance decreases,
the predetermined specificity value being a numerical value from 0 to 1, inclusive, and set to be larger when a radius of the peripheral target is smaller and smaller when the radius of the peripheral target is larger,
a base boarding location recognition difficulty being calculated by subtracting the predetermined specificity value from 1,
the boarding location recognition difficulty being calculated by applying a correction to the base boarding location recognition difficulty, the correction being based on the distance, and
the boarding location recognition difficulty being a numerical value expressing a degree of difficulty for the user to visually recognize each of the boarding location candidates,
determine one of the boarding location candidates as the boarding location such that the one of the boarding location candidates has a lower boarding location recognition difficulty than others of the boarding location candidates, and
transmit a movement instruction to an in-vehicle terminal installed in the dispatched vehicle, the movement instruction instructing the in-vehicle terminal to move the dispatched vehicle autonomously from a current location to the boarding location,
the in-vehicle terminal being configured to control the dispatched vehicle to move autonomously from the current location to the boarding location in response to the movement instruction.

12. The vehicle dispatch service network according to claim 11, wherein
the range is a 100 m radius of the respective one of the boarding location candidates.

* * * * *